US012580129B2

(12) United States Patent
Son et al.

(10) Patent No.: US 12,580,129 B2
(45) Date of Patent: Mar. 17, 2026

(54) MULTILAYER CERAMIC CAPACITOR INCLUDING A DEPRESSION ON AN OUTER SURFACE OF THE BODY IN WHICH AN EXTERNAL ELECTRODE IS DISPOSED

(71) Applicant: SAMSUNG ELECTRO-MECHANICS CO., LTD., Suwon-si (KR)

(72) Inventors: Won Su Son, Suwon-si (KR); Myeong Hak Park, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 105 days.

(21) Appl. No.: 18/537,482

(22) Filed: Dec. 12, 2023

(65) Prior Publication Data

US 2024/0194409 A1 Jun. 13, 2024

(30) Foreign Application Priority Data

Dec. 13, 2022 (KR) ......................... 10-2022-0173424

(51) Int. Cl.
*H01G 4/224* (2006.01)
*H01G 4/232* (2006.01)
(Continued)

(52) U.S. Cl.
CPC ............. *H01G 4/224* (2013.01); *H01G 4/232* (2013.01); *H01G 4/30* (2013.01); *H01G 4/12* (2013.01)

(58) Field of Classification Search
None
See application file for complete search history.

(56) References Cited

U.S. PATENT DOCUMENTS

2010/0157507 A1 6/2010 Matsumoto et al.
2012/0229952 A1 9/2012 Kim
(Continued)

FOREIGN PATENT DOCUMENTS

JP S60-096813 U 7/1985
JP H02-038722 U 3/1990
(Continued)

OTHER PUBLICATIONS

English translation of JP H0238722, no date.*
(Continued)

*Primary Examiner* — Eric W Thomas
(74) *Attorney, Agent, or Firm* — MORGAN, LEWIS & BOCKIUS LLP

(57) ABSTRACT

A multilayer ceramic capacitor includes a body including a capacitance region in which a first internal electrode and a second internal electrode are alternately stacked in a first direction with a dielectric layer interposed therebetween and first and second external electrodes spaced apart from each other with the capacitance region interposed therebetween and connected to the first and second internal electrodes, respectively. The body further includes cover layers disposed on the capacitance region in the first direction, a plurality of depressions are disposed in an outer surface of the body in the first direction, the depressions are spaced apart from outer end surfaces of the body in the second direction, and a bending length of each external electrode in the second direction is greater than a longest distance from each of the outer end surfaces of the body in the second direction to a closer one of the depressions.

22 Claims, 7 Drawing Sheets

(51) Int. Cl.
　　 *H01G 4/30*　　　　(2006.01)
　　 *H01G 4/12*　　　　(2006.01)

(56)　　　　　　References Cited

U.S. PATENT DOCUMENTS

| | | |
|---|---|---|
| 2013/0050895 A1 | 2/2013 | Tezuka et al. |
| 2013/0294010 A1 | 11/2013 | Lee et al. |
| 2015/0016014 A1 | 1/2015 | Park et al. |
| 2016/0233027 A1 | 8/2016 | Iijima et al. |
| 2017/0040112 A1* | 2/2017 | Tanaka ................... H01G 4/232 |
| 2018/0174754 A1* | 6/2018 | Kitamura .......... C04B 35/62605 |
| 2020/0066444 A1* | 2/2020 | Yang ...................... H01G 4/232 |

FOREIGN PATENT DOCUMENTS

| | | |
|---|---|---|
| JP | H08-045777 A | 2/1996 |
| JP | 2007-067026 A | 3/2007 |
| JP | 4511625 B1 | 7/2010 |
| JP | 5228890 B2 | 7/2013 |
| KR | 10-1525666 B1 | 6/2015 |
| KR | 10-1736721 B1 | 5/2017 |

OTHER PUBLICATIONS

English translation of JP 60-096813U, no date.*
Extended European Search Report dated Jul. 8, 2024, issued in European Patent Application No. 23213312.4.

\* cited by examiner

MULTILAYER CERAMIC CAPACITOR INCLUDING A DEPRESSION ON AN OUTER SURFACE OF THE BODY IN WHICH AN EXTERNAL ELECTRODE IS DISPOSED

CROSS-REFERENCE TO RELATED APPLICATION(S)

This application claims the benefit of priority to Korean Patent Application No. 10-2022-0173424 filed on Dec. 13, 2022 in the Korean Intellectual Property Office, the disclosure of which is incorporated herein by reference in its entirety.

BACKGROUND

1. Field

The present disclosure relates to a multilayer ceramic capacitor.

2. Description of Related Art

Multilayer ceramic capacitors have been widely used as components of electronic devices, such as computers, personal digital assistants (PDAs), and mobile phones, due to their small size, high capacitance, and easy mounting, and have also been widely used as components of electrical devices (including vehicles) due to their high reliability and high strength.

When multilayer ceramic capacitors are used in electronic devices, the multilayer ceramic capacitors may be miniaturized. For example, large capacitance against volume of multilayer ceramic capacitors may become more important, and minimizing a size of multilayer ceramic capacitors, while securing reliability of multilayer ceramic capacitors, may become more important.

When a multilayer ceramic capacitor is used in an electric device, the multilayer ceramic capacitor may be exposed to harsh environments (e.g., a high voltage, high temperature, a possibility of external shock) and high reliability of the multilayer ceramic capacitor may be more important.

SUMMARY

Exemplary embodiments provide a multilayer ceramic capacitor having a structure that reduces a possibility of the occurrence of defects (e.g., cracks or delamination) and that may be stably manufactured.

Exemplary embodiments provide a multilayer ceramic capacitor having a structure that may be stably manufactured even in a state in which it is difficult to accurately know internal shrinkage characteristics and providing a higher degree of freedom in design.

Exemplary embodiments provide a multilayer ceramic capacitor having improved reliability by stably blocking penetration of external moisture or foreign matter.

Exemplary embodiments provide a multilayer ceramic capacitor having a stable structure by absorbing an internal step difference.

According to an aspect of the present disclosure, a multilayer ceramic capacitor includes: a body including a capacitance region in which a first internal electrode and a second internal electrode are alternately stacked in a first direction with a dielectric layer interposed therebetween; and first and second external electrodes spaced apart from each other with the capacitance region interposed therebetween in a second direction, different from the first direction, disposed on the body, and connected to the first and second internal electrodes, respectively, wherein the body further includes a plurality of cover layers disposed to sandwich the capacitance region therebetween in the first direction, one of the plurality of cover layers has a plurality of depressions each disposed in a first outer surface of one of the plurality of cover layers in the first direction, the plurality of depressions are spaced apart from second outer surfaces of one of the plurality of cover layers in the second direction, and a bending length L3 of each of the first and second external electrodes in the second direction is greater than a longest distance L4 from each of the second outer surfaces of one of the plurality of cover layers in the second direction to a closer one of the plurality of depressions.

According to another aspect of the present disclosure, a multilayer ceramic capacitor includes: a body including a capacitance region in which a first internal electrode and a second internal electrode are alternately stacked in a first direction with a dielectric layer interposed therebetween; and first and second external electrodes spaced apart from each other with the capacitance region interposed therebetween in a second direction, different from the first direction, disposed on the body, and connected to the first and second internal electrodes, respectively, wherein the body further includes a plurality of cover layers disposed to sandwich the capacitance region therebetween in the first direction, one of the plurality of cover layers has a plurality of depressions each disposed in a first outer surface of one of the plurality of cover layers in the first direction, the plurality of depressions are spaced apart from second outer surfaces of one of the plurality of cover layers in the second direction, and each of the plurality of depressions overlaps the first internal electrode and the second internal electrode in the first direction.

According to still another aspect of the present disclosure, a multilayer ceramic capacitor includes: a body including a capacitance region in which a first internal electrode and a second internal electrode are alternately stacked in a first direction with a dielectric layer interposed therebetween; and first and second external electrodes disposed on outer end surfaces of the body and spaced apart from each other in a second direction, different from the first direction, and connected to the first and second internal electrodes, respectively, wherein the body further includes a plurality of depressions each disposed on at least one outer surface thereof in the first direction, extending in a third direction, different from the first and second directions, and having two wall surfaces facing each other in the second direction, and each of the first and second external electrodes extends onto the at least one outer surface of the body and covers at least a portion of a closer one of the plurality of depressions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1A:
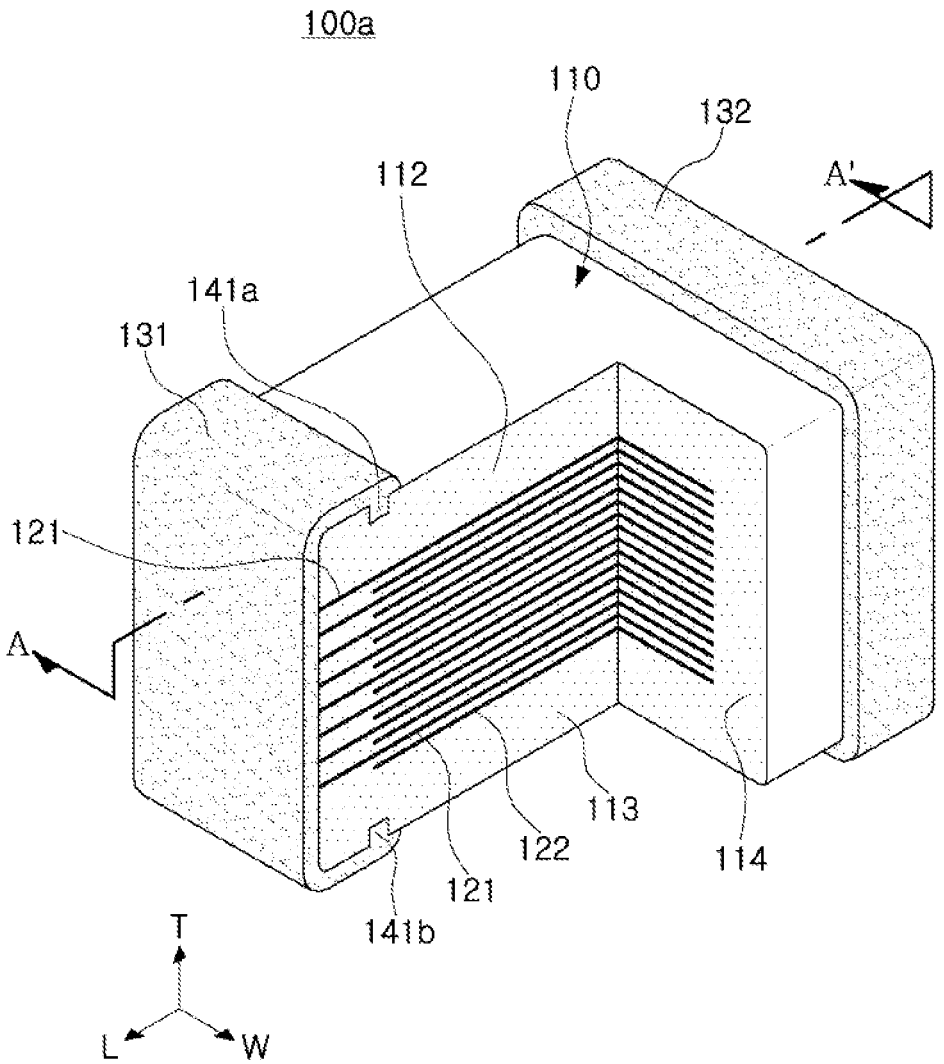
FIG. 1A is a perspective view illustrating a multilayer ceramic capacitor and an inside thereof according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings.

Throughout the specification, unless explicitly described to the contrary, the word "comprise" and variations, such as "comprises" or "comprising", will be understood to imply the inclusion of stated elements but not the exclusion of any other elements.

In defining directions of a hexahedron to clearly describe the exemplary embodiments of the present disclosure, L, W, and T indicated in the drawings represent a length direction, a width direction, and a thickness direction, respectively. Here, the thickness direction may be used as having the same concept as that of a stacking direction (or a first direction) in which dielectric layers are stacked.

Figure 1B:
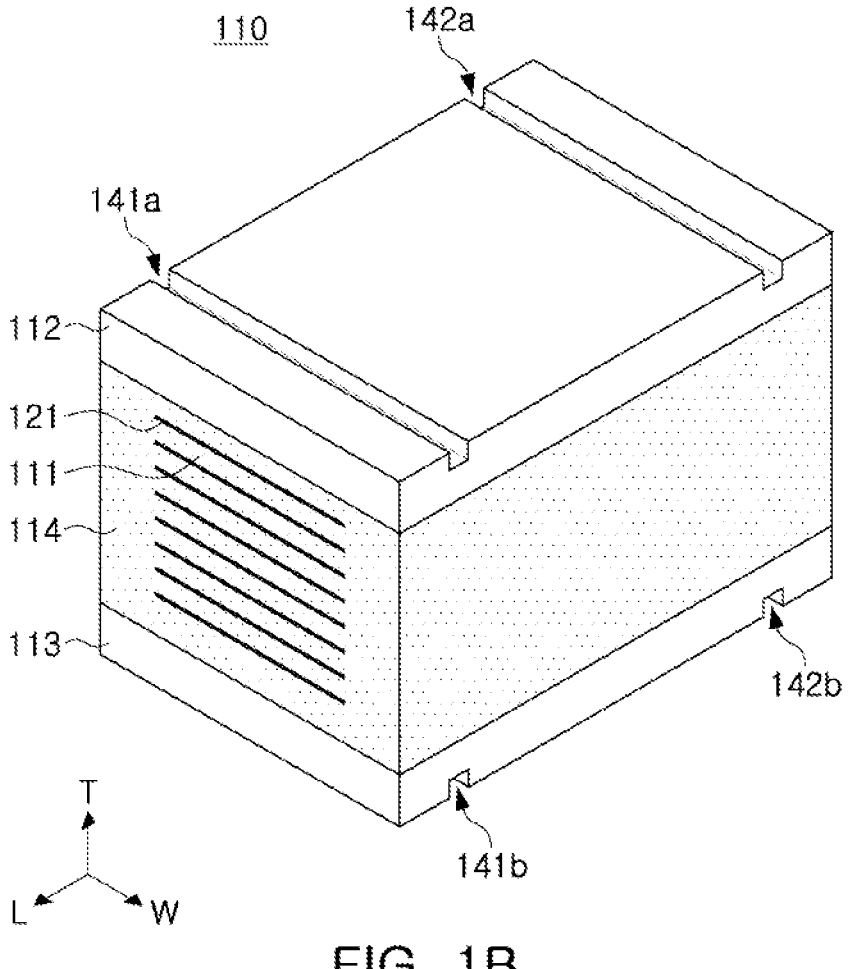
FIG. 1B is a perspective view illustrating a body of a multilayer ceramic capacitor according to an exemplary embodiment.
Figure 2A:
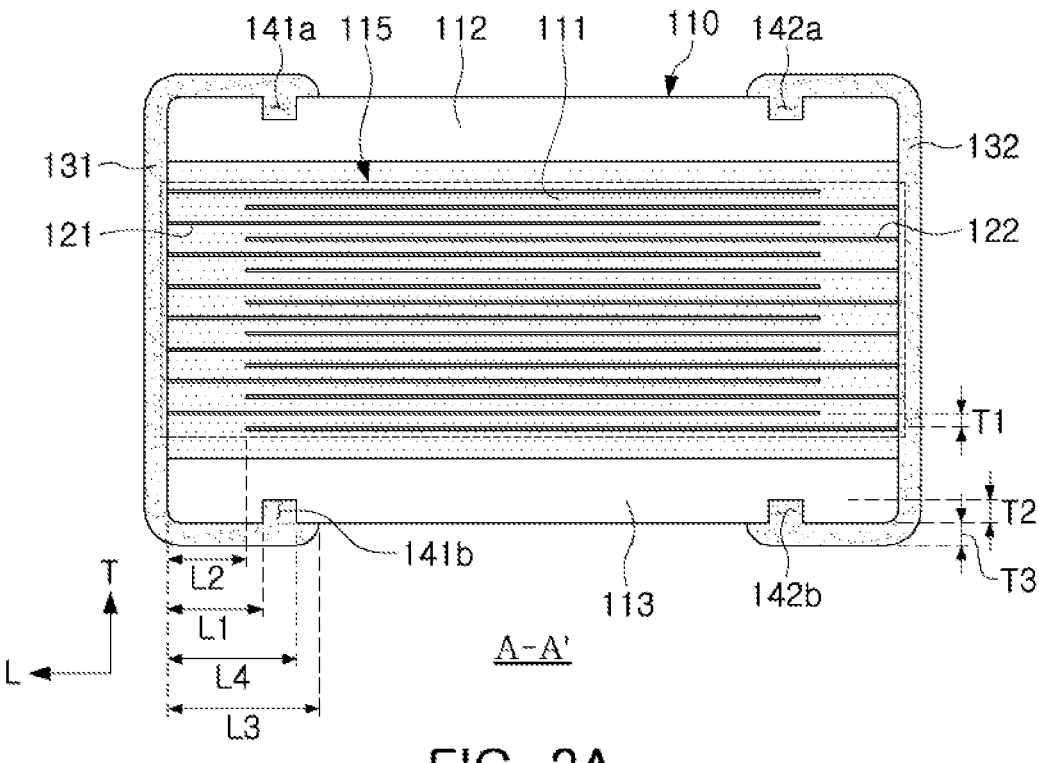
FIG. 2A is a cross-sectional view illustrating the multilayer ceramic capacitor of FIG. 1A.

Referring to FIGS. 1A, 1B, and 2A, a multilayer ceramic capacitor 100a according to an exemplary embodiment in the present disclosure may include a body 110, a first external electrode 131, and a second external electrode 132.

The body 110 may include a capacitance region 115 in which a first internal electrode 121 and a second internal electrode 122 are alternately stacked in the first direction (e.g., the T direction) with a dielectric layer 111 interposed therebetween.

For example, the body 110 may be formed of a ceramic body by firing the capacitance region 115. Here, the dielectric layer 111 is in a sintered state, and adjacent dielectric layers 111 may be integrated such that boundaries therebetween may not be readily apparent without using a scanning electron microscope (SEM).

For example, the body 110 may be formed of a hexahedron having both side surfaces in a length direction (L), both side surfaces in a width direction (W), and both side surfaces in a thickness direction (T), and the edges and/or corners of the hexahedron may be polished to be rounded. However, a shape and dimensions of the body 110 and the number of stacked dielectric layers 111 are not limited to those shown in the present exemplary embodiment.

The thickness of the dielectric layer 111 may be changed according to a capacitance design of the multilayer ceramic capacitor 100a, and may include ceramic powder having a high permittivity, for example, barium titanate (BaTiO$_3$)-based powder but is not limited thereto. In addition, various ceramic additives (e.g., MgO, Al$_2$O$_3$, SiO$_2$, and ZnO), organic solvents, plasticizers, binders, dispersants, etc. may be added to the ceramic powder according to required specifications of the multilayer ceramic capacitor 100a.

An average particle diameter of the ceramic powder used to form the dielectric layer 111 is not particularly limited and may be adjusted according to the required specifications of the multilayer ceramic capacitor 100a (e.g., miniaturization and/or high capacitance are required for capacitors for electronic devices, and high withstand voltage characteristics and/or high strength are required for capacitors for electric devices). For example, the average particle diameter of the ceramic powder may be adjusted to 400 nm or less.

For example, the dielectric layer 111 may be formed by applying a slurry including powder, such as barium titanate (BaTiO$_3$), on a carrier film and drying the slurry to form a plurality of ceramic sheets. The ceramic sheet may be formed by preparing a slurry by mixing ceramic powder, a binder, and a solvent and forming the slurry as a sheet having a thickness of several μm by a doctor blade method, but is not limited thereto.

The first internal electrode 121 and the second internal electrode 122 may be formed by printing a conductive paste including a conductive metal such that the first internal electrode 121 and the second internal electrode 122 are alternately exposed to one side surface and the other side surface of the body 110 in the length direction L in the stack direction (e.g., T direction), and the first internal electrode 121 and the second internal electrode 122 may be electrically insulated from each other by the dielectric layer interposed therebetween.

For example, each of the first internal electrode 121 and the second internal electrode 122 may be formed of a conductive paste for internal electrodes including 40 wt % to 50 wt % of conductive metal powder having an average particle size of 0.1 μm to 0.2 μm, but is not limited thereto. The conductive paste may be nickel (Ni), copper (Cu), palladium (Pd), silver (Ag), lead (Pb) or platinum (Pt) alone or alloys thereof, and the present disclosure is not limited thereto.

For example, internal electrode patterns may be formed by applying the conductive paste for internal electrodes on the ceramic sheet by a printing method or the like. A screen-printing method, a gravure printing method, an inkjet printing method, and the like may be used as a printing method of the conductive paste, but the present disclosure is not limited thereto. For example, 200 to 300 ceramic sheets on which the internal electrode patterns are printed may be stacked, pressed, and fired to form the body 110.

Capacitance of the multilayer ceramic capacitor 100a may be proportional to an overlapping area of the first internal electrode 121 and the second internal electrode 122 in the stacking direction (e.g., T direction), may be proportional to a total stack number of the first internal electrode 121 and the second internal electrode 122, and may be inversely proportional to an interval between the first internal electrode 121 and the second internal electrode 122. The interval between the internal electrodes may be substantially equal to a thickness of one dielectric layer 111.

The multilayer ceramic capacitor 100a may have a larger capacitance compared to a thickness thereof as the interval between the first internal electrode 121 and the second internal electrode 122 is reduced. Meanwhile, a withstand voltage of the multilayer ceramic capacitor 100a may be higher as the interval between the internal electrodes is longer. Therefore, the interval between the internal electrodes may be adjusted according to required standards of the multilayer ceramic capacitor 100a (e.g., miniaturization and/or high capacitance are required for capacitors for electronic devices, and high withstand voltage characteristics and/or high strength are required for capacitors for electric devices). The thickness of each of the first internal electrode 121 and the second internal electrode 122 may also be affected by the interval between the internal electrodes.

For example, when high withstand voltage characteristics and/or strong strength are required, the multilayer ceramic capacitor 100a may be designed so that the interval between the first internal electrode 121 and the second internal electrode 122 exceeds twice a thickness of each of the first internal electrode 121 and the second internal electrode 122. For example, when miniaturization and/or high capacitance are required, the multilayer ceramic capacitor 100a may be designed so that the thickness of each of the first internal electrode 121 and the second internal electrode 122 is 0.4 µm or less and the total number of layers is 400 or more.

The first and second external electrodes 131 and 132 may be spaced apart from each other with the capacitance region 115 therebetween in a second direction (e.g., the L direction) different from the first direction (e.g., the T direction) on the body, and may be connected to each of the first internal electrode 121 and the second internal electrode 122.

For example, each of the first and second external electrodes 131 and 132 may be formed by dipping into a paste including a metal component, a method of printing a conductive paste, a sheet transfer, or a pad transfer method, sputter plating, or electrolytic plating. For example, the first and second external electrodes 131 and 132 may include a fired layer formed by firing the paste and a plating layer formed on an outer surface of the fired layer, and may further include a conductive resin layer between the fired layer and the plating layer. For example, the conductive resin layer may be formed by including conductive particles in a thermosetting resin, such as epoxy. The metal component may be copper (Cu), nickel (Ni), palladium (Pd), platinum (Pt), gold (Au), silver (Ag), lead (Pb), tin (Sn) alone or alloys thereof, but is not limited thereto.

The multilayer ceramic capacitor 100a may be mounted or embedded in an external substrate (e.g., a printed circuit board), and may be connected to at least one of wiring, land, solder, and bumps of the external substrate through the first and second external electrodes 131 and 132 to be electrically connected to a circuit (e.g., an integrated circuit or a processor) electrically connected to the external substrate.

Referring to FIGS. 1A, 1B, and 2A, the body 110 may include at least one of a plurality of cover layers 112 and 113 and a plurality of margin regions 114.

The plurality of cover layers 112 and 113 may be disposed to sandwich the capacitance region 115 therebetween in the first direction (e.g., T direction). Each of the plurality of cover layers 112 and 113 may be thicker than one dielectric layer 111 and may provide upper and lower surfaces of the body 110. A portion of each of the first and second external electrodes 131 and 132 may be disposed on a lower and/or upper surface of the body 110.

The plurality of cover layers 112 and 113 may prevent external environmental factors (e.g., moisture, plating solution, and foreign matter) from penetrating into the capacitance region 115, protect the body 110 from external impact, and improve bending strength of the body 110. For example, the plurality of cover layers 112 and 113 may include the same material as that of the dielectric layer 111 (e.g., a ferroelectric material, such as barium titanate).

The plurality of margin regions 114 may be arranged to sandwich the capacitance region 115 therebetween in a third direction (e.g., the W direction), different from the first and second directions (e.g., the T and L directions). Since the plurality of margin regions 114 may prevent the first internal electrode 121 and the second internal electrode 122 from being exposed to the surface of the body 110 in the third direction (e.g., the W direction), external environmental factors (e.g., moisture, a plating solution, foreign matter) may be prevented from penetrating into the first internal electrode 121 and the second internal electrode 122 through the surface in the third direction, and the reliability and lifespan of the multilayer ceramic capacitor 100a may be improved. In addition, since the first internal electrode 121 and the second internal electrode 122 may be formed to efficiently expand in the third direction due to the plurality of margin regions 114, the plurality of margin regions 114 may contribute to improving capacitance of the multilayer ceramic capacitor 100a by increasing an overlapping area of the internal electrode 121 and the second internal electrode 122.

Referring to FIGS. 1A, 1B, and 2A, one of the plurality of cover layers 112 and 113 may have a plurality of depressions 141a, 141b, 142a, and 142b in positions spaced apart from second outer surfaces of one of the plurality of cover layers 112 and 113 in the second direction (e.g., the L direction). The plurality of depressions 141a, 141b, 142a, and 142b may be formed on first outer surfaces of the plurality of cover layers 112 and 113 in the first direction (e.g., the T direction). For example, one of the plurality of cover layers 112 and 113 may have a plurality of depressions 141a and 142a, and the other of the plurality of cover layers 112 and 113 may have a plurality of depressions 141b and 142b.

Figure 3:
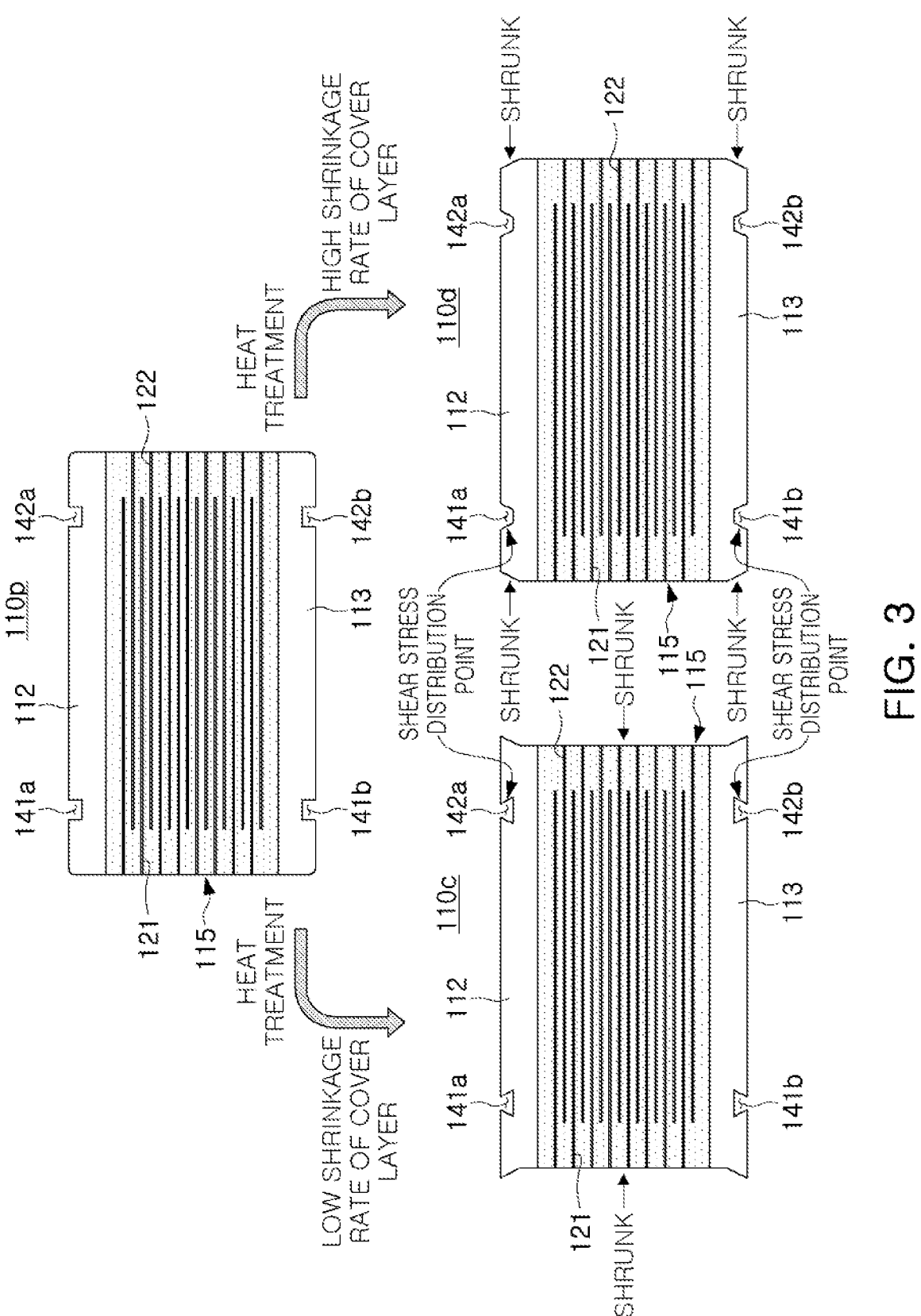
FIG. 3 is a cross-sectional view illustrating a change in shape of a body of a multilayer ceramic capacitor according to sintering according to an exemplary embodiment in the present disclosure.
Figure 4:
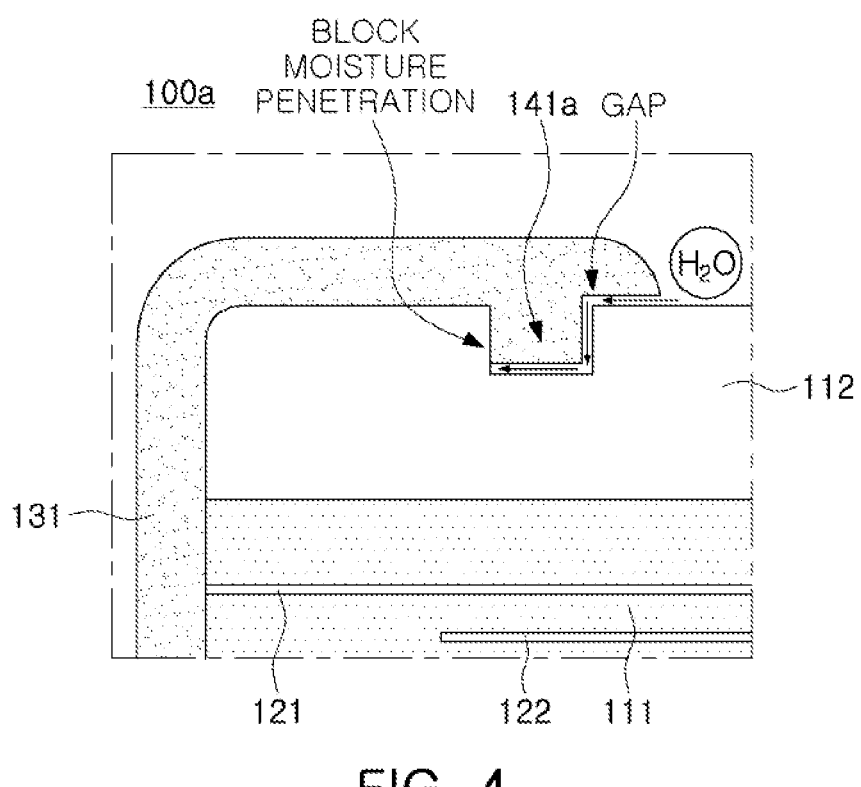
FIG. 4 is a cross-sectional view illustrating that a plurality of depressions of a multilayer ceramic capacitor block moisture penetrating into a gap between a body and an external electrode according to an exemplary embodiment in the present disclosure.

Referring to FIG. 3, when a shrinkage rate of the plurality of cover layers 112 and 113 due to firing (heat treatment) is lower than that of the dielectric layer, a body 110p before firing (heat treatment) may be deformed to a body 110c in a first state by firing (heat treatment). The capacitance region 115 of the body 110c may be contracted more than the plurality of cover layers 112 and 113, and the plurality of cover layers 112 and 113 may be subjected to shear stress due to relative contraction of the capacitance region 115. Since the plurality of depressions 141a, 141b, 142a, and 142b may disperse the shear stress, concentration of the shear stress at a specific point (e.g., the second outer surfaces in the second direction) of the plurality of cover layers 112 and 113 may be prevented. Concentration of the shear stress may cause cracks or delamination. According to the shear stress dispersing action of the plurality of depressions 141*a*, 141*b*, 142*a*, and 142*b*, a shape of the plurality of depressions 141*a*, 141*b*, 142*a*, and 142*b* may also be deformed (for example, deformation of a difference between an upper width and a lower width).

Referring to FIG. 3, when the shrinkage rate of the plurality of cover layers 112 and 113 due to firing (heat treatment) is relatively higher than that of the dielectric layer 111, the body 110*p* before firing (heat treatment) may be deformed to a body 110*d* in a second state. The plurality of cover layers 112 and 113 of the body 110*d* may contract more than the capacitance region 115 and may be subjected to shear stress due to the relative contraction. Since the plurality of depressions 141*a*, 141*b*, 142*a*, and 142*b* may disperse the shear stress, concentration of the shear stress at a specific point of the plurality of cover layers 112 and 113 may be prevented. Concentration of the shear stress may cause cracks or delamination. According to the shear stress dispersing action of the plurality of depressions 141*a*, 141*b*, 142*a*, and 142*b*, a shape of the plurality of depressions 141*a*, 141*b*, 142*a*, and 142*b* may also be deformed (for example, deformation of a difference between an upper width and a lower width).

As a result, the multilayer ceramic capacitor 100*a* according to an exemplary embodiment in the present disclosure may have a structure that reduces a possibility of occurrence of defects (e.g., cracks, delamination) and may be stably manufactured.

Also, a thickness T1 of one dielectric layer 111 may vary according to an overall size of the multilayer ceramic capacitor 100*a*, and the thickness T1 of one dielectric layer 111 and/or the overall size of the multilayer ceramic capacitor 100*a* may affect the shrinkage relationship between the capacitance region 115 and the plurality of cover layers 112 and 113. Accordingly, it may be difficult to accurately predict the shrinkage relationship between the capacitance region 115 and the plurality of cover layers 112 and 113. The multilayer ceramic capacitor 100*a* according to an exemplary embodiment in the present disclosure may have a structure that may be stably manufactured even in a state in which the shrinkage relationship between the capacitance region 115 and the plurality of cover layers 112 and 113 is not accurately known, and may provide a higher degree of design freedom.

For example, each of the plurality of depressions 141*a*, 141*b*, 142*a*, and 142*b* may extend in the third direction (e.g., the W direction) (which may be expressed as a ditch shape) different from the first and second directions. A difference in shrinkage rate between the plurality of cover layers 112 and 113 and the capacitance region 115 may be due to a difference between stack structures therein in the first direction, and a difference (corresponding to isotropy) between a shrinkage length of the capacitance region 115 and a shrinkage length of the capacitance region 115 in the second and third directions may be different from that of the plurality of cover layers 112 and 113. A shrinkage behavior of the plurality of cover layers 112 and 113 may be close to an isotropic shrinkage behavior, and a shrinkage behavior of the capacitance region 115 may be close to an anisotropic shrinkage behavior.

Since an extending direction of each of the plurality of depressions 141*a*, 141*b*, 142*a*, and 142*b* may be different from the first direction, the plurality of depressions 141*a*,

141*b*, 142*a*, and 142*b* may cancel out the difference between the shrinkage length in the first direction and the shrinkage length in the second and third directions. Accordingly, the shear stress dispersion efficiency of the plurality of depressions 141*a*, 141*b*, 142*a*, and 142*b* may be further improved.

For example, the plurality of depressions 141*a*, 141*b*, 142*a*, and 142*b* may not extend to be formed in outer surfaces of the plurality of margin regions 114 in the third direction (e.g., the W direction). The effect of depressions on the outer surfaces of the plurality of margin regions 114 in the third direction on dispersing the shear stress of the body 110 may be smaller than that of the plurality of depressions 141*a*, 141*b*, 142*a*, and 142*b*. Accordingly, the plurality of margin regions 114 may not have depressions and may be designed to focus more on increasing reliability improvement efficiency compared to an overall thickness of the plurality of margin regions 114.

A bending length L3 of each of the first and second external electrodes 131 and 132 in the second direction may be greater than the longest distance L4 from second outer surfaces of one of the plurality of cover layers 112 and 113 in the second direction (e.g., the L direction) to a closer one of the plurality of depressions 141*a*, 141*b*, 142*a*, and 142*b*. Each of the first and second external electrodes 131 and 132 may contact a position of the first outer surface in the first direction (e.g., the T direction) between the plurality of depressions 141*a*, 141*b*, 142*a*, and 142*b*. The bending length L3 of each of the first and second external electrodes 131 and 132 in the second direction may be a length from second outer surfaces of the plurality of cover layers 112 and 113 in the second direction (e.g., the L direction) to the edge of each of the first and second external electrodes 131 and 132 in the second direction (e.g., the L direction). A difference between the bending length L3 and the longest distance L4 in the second direction may be appropriately determined in consideration of a difference (process distribution) between the design and actual formation of the first and second external electrodes 131 and 132. Bending of the bending length L3 in the second direction may refer to a shape in which the first and second external electrodes 131 and 132 are bent from the first direction (e.g., the T direction) to the second direction (e.g., the L direction), and a starting point of the bending length L3 in the second direction may be second outer surfaces of the plurality of cover layers 112 and 113 in the second direction (e.g., the L direction) at which bending of the first and second external electrodes 131 and 132 starts. Accordingly, a starting point of the bending length L3 in the second direction and a starting point of the longest distance L4 may be the same.

Accordingly, since the plurality of depressions 141*a*, 141*b*, 142*a*, and 142*b* may be stably covered by the first and second external electrodes 131 and 132, the plurality of depressions 141*a*, 141*b*, 142*a*, and 142*b* may be stably protected from external physical collision by the first and second external electrodes 131 and 132. Accordingly, external shock protection performance or overall strength of the plurality of cover layers 112 and 113 may be further improved.

Alternatively, each of the plurality of depressions 141*a*, 141*b*, 142*a*, and 142*b* may overlap the first internal electrode 121 and the second internal electrode 122 in the first direction (e.g., the T direction). The shortest distance L1 from the second outer surfaces of the plurality of cover layers 112 and 113 in the second direction (e.g., the L direction) to a closer one of the plurality of depressions 141*a*, 141*b*, 142*a*, and 142*b* may be longer than a distance L2 between the second internal electrode 122 and the first external electrode 131 in the second direction (e.g., the L direction) and may be longer than a distance between the first internal electrode 121 and the second external electrode 132 in the second direction. A difference between the shortest distance L1 and the distance L2 may be appropriately determined in consideration of the total stack number of the first internal electrode 121 and the second internal electrode 122 or a size of the body 110.

A portion between the second internal electrode 122 and the first external electrode 131 and a portion between the first internal electrode 121 and the second external electrode 132 may be expressed as an L-margin, and may be a portion in which the total stack number of the internal electrodes is half, compared to a central portion of the capacitance region 115. The body 110 may be compressed in the first direction (e.g., the T direction) during a manufacturing process, and a difference of the total stack number of the internal electrodes between the L-margin and the central portion may cause a step difference between the L-margin and the central portion during the compressing process.

The shortest distance L1 of the plurality of cover layers 112 and 113 from the second outer surfaces of the plurality of cover layers 112 and 113 in the second direction (e.g., the L direction) to the plurality of depressions 141a, 141b, 142a, and 142b may be greater than a thickness of a portion of the plurality of cover layers 112 and 113 overlapping the plurality of depressions 141a, 141b, 142a, 142b in the first direction (e.g., the T direction). Accordingly, a portion of the plurality of cover layers 112 and 113 overlapping the L-margin in the first direction (e.g., the T direction) may absorb a step difference between the L-margin and the central portion during the compression process. Accordingly, since the body 110 may have a more stable structure, overall reliability or strength of the body 110 may be further improved.

For example, the depth T2 of each of the plurality of depressions 141a, 141b, 142a, and 142b is greater than the thickness T1 of one dielectric layer 111 and may be smaller than the thickness of one of the plurality of cover layers 112 and 113. The overall size (corresponding to T2) of each of the plurality of depressions 141a, 141b, 142a, and 142b may be a size of the degree due to the addition of a separate process for forming the plurality of depressions 141a, 141b, 142a, and 142b but is not limited thereto. A relationship between a depth T2 of each of the plurality of depressions 141a, 141b, 142a, and 142b and a thickness T3 of each of the first and second external electrodes 131 and 132 may vary depending on the overall size of the multilayer ceramic capacitor 100a or a specific shape of the first and second external electrodes 131 and 132.

Figure 5A:
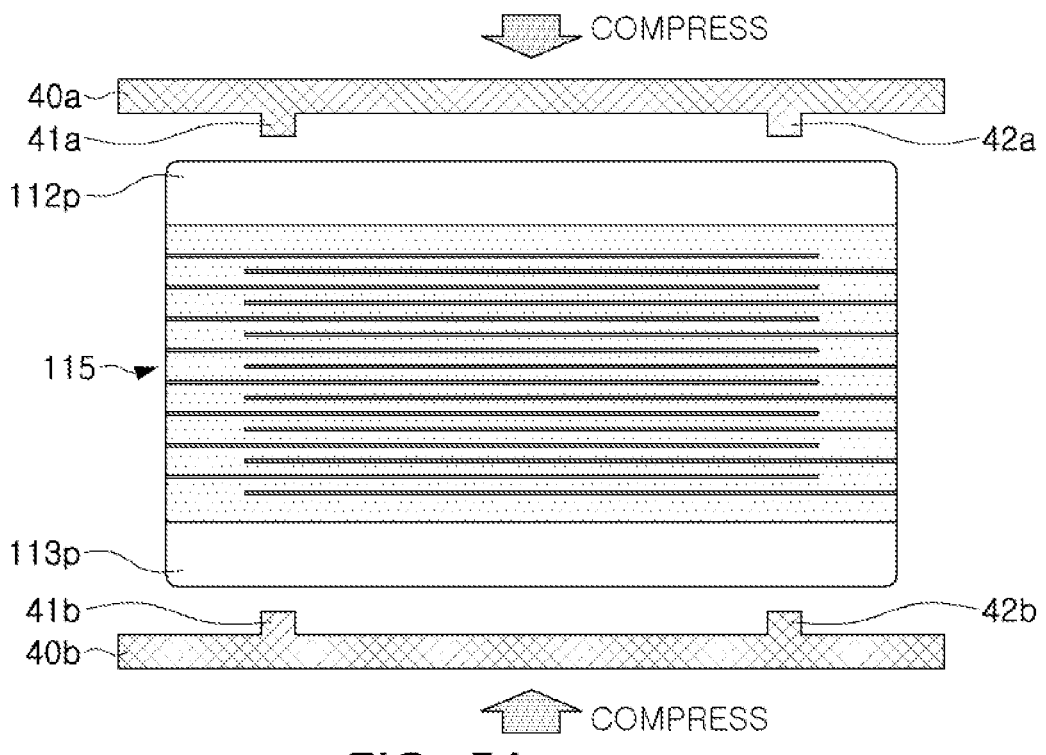
FIG. 5A is a cross-sectional view illustrating a first method of forming a plurality of depressions of a multilayer ceramic capacitor according to an exemplary embodiment in the present disclosure.

Referring to FIG. 5A, a plurality of compression plates 40a and 40b each including a plurality of protrusions 41a, 41b, 42a, and 42b may compress first outer surfaces of cover layers 112p and 113p in which a plurality of depressions are not formed. Accordingly, the first outer surfaces of the cover layers 112p and 113p may be deformed, and a plurality of depressions may be formed. The compression may be performed before firing (heat treatment).

Figure 5B:
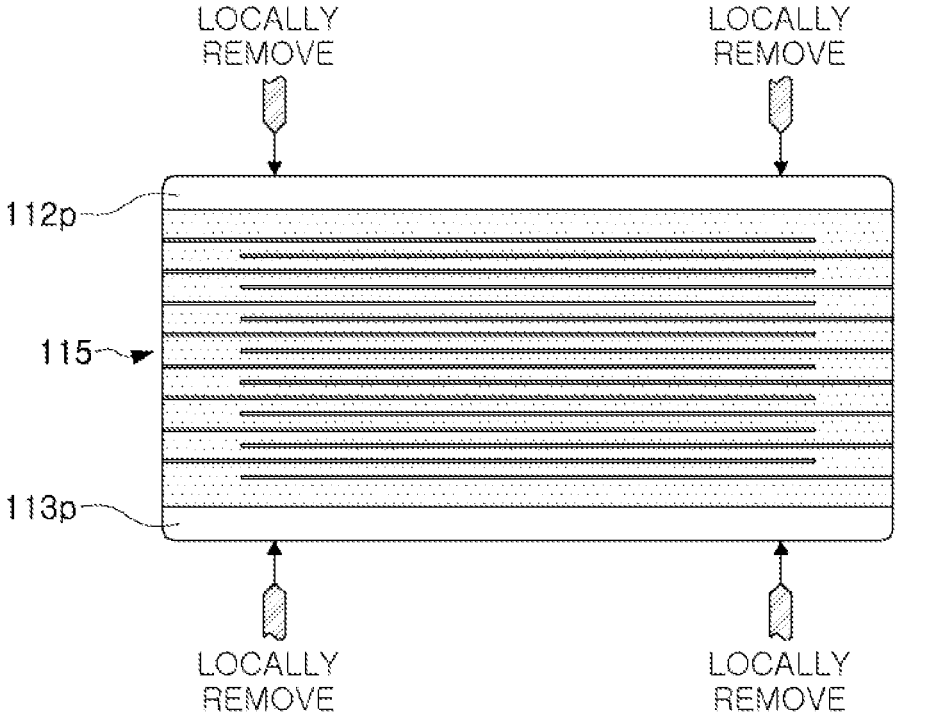
FIG. 5B is a cross-sectional view illustrating a second method of forming a plurality of depressions of a multilayer ceramic capacitor according to an exemplary embodiment in the present disclosure.

Referring to FIG. 5B, lasers may be irradiated to the first outer surfaces of the cover layers 112p and 113p on which the plurality of depressions are not formed. Accordingly, portions of the cover layers 112p and 113p may be removed, and a plurality of depressions may be formed. The irradiation may be performed before firing (heat treatment).

Referring to FIGS. 1A, 1B, 2A, and 4, a portion of the first external electrode 131 may be disposed inside of one of the plurality of depressions 141a, 141b, 142a, and 142b, and a portion of the second external electrode 132 may be disposed inside of the other one of the plurality of depressions 141a, 141b, 142a, and 142b.

A gap between the body 110 and the first and second external electrodes 131 and 132 may be a path through which external moisture or foreign matter penetrate. Since the plurality of depressions 141a, 141b, 142a, and 142b may bend the path at least four times, moisture penetrating into the gap between the body 110 and the first and second external electrodes 131 and 132 is stably prevented. Therefore, the multilayer ceramic capacitor 100a according to an exemplary embodiment in the present disclosure may have improved reliability by stably blocking the penetration of external moisture or foreign matter.

Figure 2B:
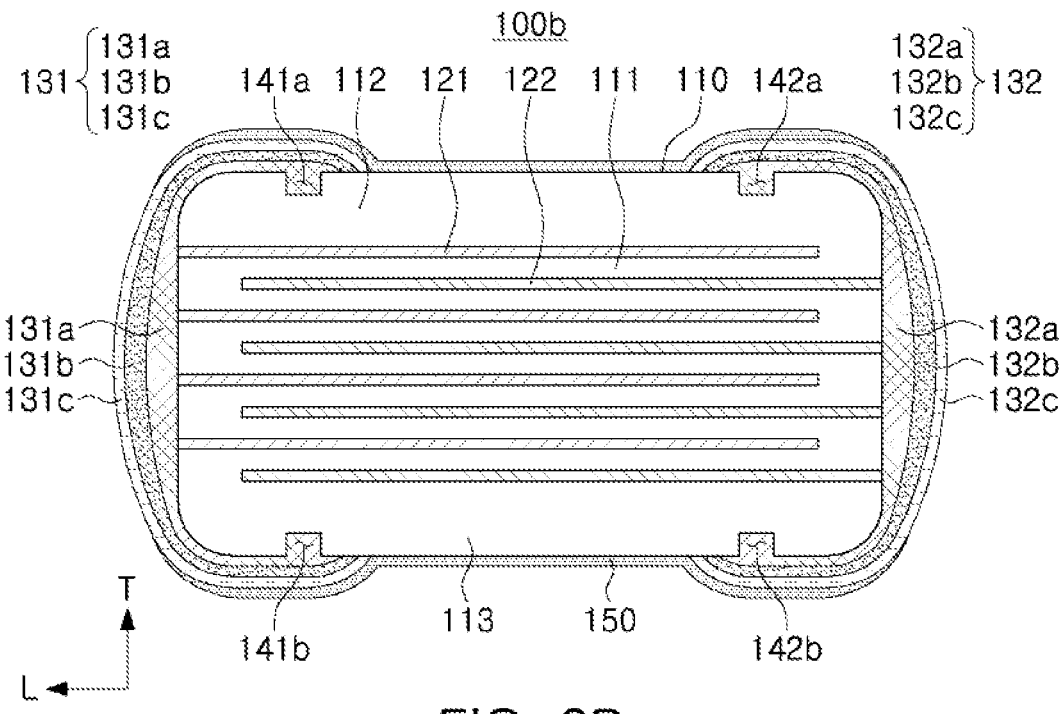
FIG. 2B is a cross-sectional view illustrating a multilayer ceramic capacitor and external electrodes thereof according to an exemplary embodiment in the present disclosure.
Figure 2C:
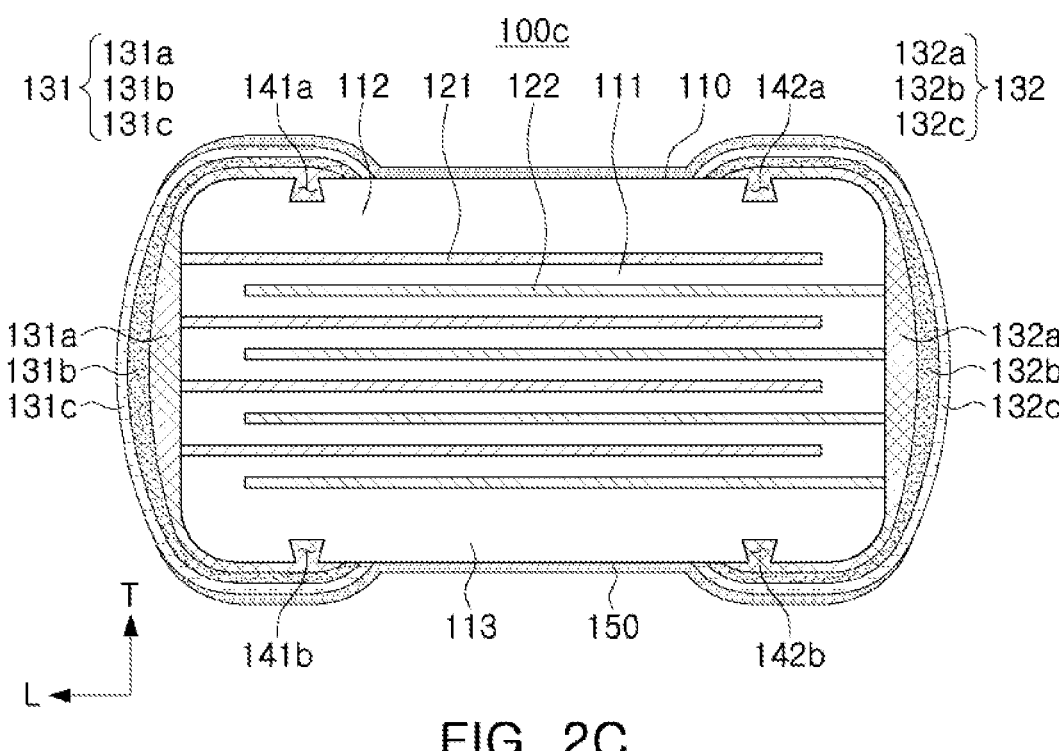
FIG. 2C is a cross-sectional view illustrating a structure in which widths of a plurality of depressions of a multilayer ceramic capacitor increase inwardly according to an exemplary embodiment in the present disclosure.
Figure 2D:
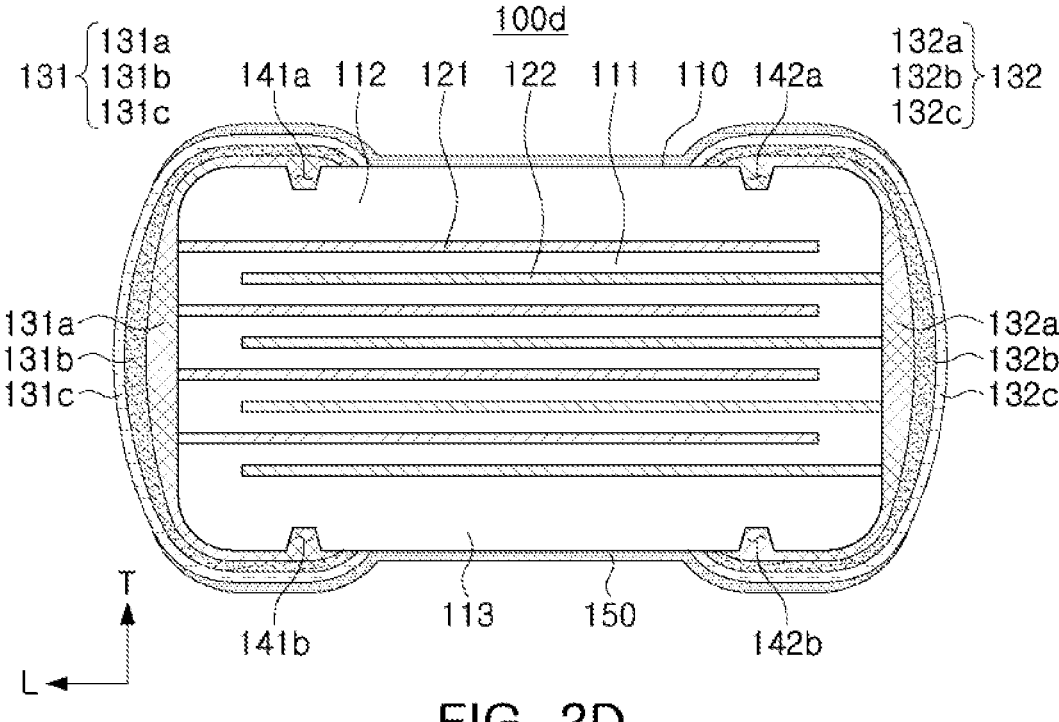
FIG. 2D is a cross-sectional view illustrating a structure in which widths of a plurality of depressions of a multilayer ceramic capacitor decrease inwardly according to an exemplary embodiment in the present disclosure.

Referring to FIGS. 2B to 2D, at least one of the first and second external electrodes 131 and 132 of the multilayer ceramic capacitors 100b, 100c, and 100d according to an exemplary embodiment in the present disclosure may include at least one of conductive resin layers 131b and 132b including a resin, base electrode layers 131a and 132a disposed between the conductive resin layers 131b and 132b and the body 110 and having conductivity higher than that of the conductive resin layers 131b and 132b, and plating layers 131c and 132c providing an outer surface of one of the first and second external electrodes 131 and 132. A portion of the surface (e.g., upper and lower surfaces) of the body 110 may be covered by a coating layer 150.

For example, the base electrode layers 131a and 132a may be formed by dipping a portion of the body 110 in a paste including a metal material and/or glass frit or firing in a state in which the paste is printed on a portion of the body 110, or may be formed by a sheet transfer or a pad transfer method. The metal material may be copper (Cu) to improve electrical connectivity with respect to the body 110 but is not limited thereto. For example, the metal material may include at least one of copper (Cu), nickel (Ni), palladium (Pd), platinum (Pt), gold (Au), silver (Ag), and lead (Pb), may vary depending on a metal material of the internal electrodes in the body 110.

For example, the plating layers 131c and 132c may be formed by sputtering or electroplating but are not limited thereto. For example, the plating layers 131c and 132c may include an inner plating layer including nickel (Ni) and an outer plating layer including tin (Sn).

For example, the conductive resin layers 131b and 132b may include a thermosetting resin, such as epoxy, and a plurality of conductive particles (e.g., the same metal material as the base electrode layer). However, it is not limited to the thermosetting resin, and the conductive resin layers 131b and 132b may include a bisphenol A resin, a glycol epoxy resin, a novolak epoxy resin, or a resin that is liquid at room temperature due to a low molecular weight thereof.

The conductive resin layers 131b and 132b may improve durability of the first and second external electrodes 131 and 132 against external impact or prevent penetration of external moisture or a plating solution into the body 110. Therefore, the conductive resin layers 131b and 132b may reduce a rate at which the reliability of the first and second external electrodes 131 and 132 deteriorates even when the first and second external electrodes 131 and 132 are exposed to harsh environments.

The coating layer 150 may cover the first and second outer surfaces of the plurality of cover layers 112 and 113, and may further cover portions of the first and second external electrodes 131 and 132 and/or outer surfaces of the plurality of margin regions according to design. For example, the coating layer 150 may be formed of organic/inorganic compounds including Si to improve moisture resistance reliability of the body 110, and may be formed of organic/inorganic substances including fluorine (F) and polymer components. For example, the coating layer 150 may be implemented as a silane coupling agent or silicone-resin to have water repellency.

Referring to FIG. 2B, each of the plurality of depressions 141a, 141b, 142a, and 142b may have a constant width. For example, when the shrinkage rates of the plurality of cover layers 112 and 113 are relatively low, a shape of the plurality of depressions 141a, 141b, 142a, and 142b before firing (heat treatment) may be close to the shape of the plurality of depressions 141a, 141b, 142a, and 142b of FIG. 2D. For example, when the shrinkage rates of the plurality of cover layers 112 and 113 are relatively high, the shape of the plurality of depressions 141a, 141b, 142a, and 142b before firing (heat treatment) may be close to the shape of the plurality of depressions 141a, 141b, 142a, and 142b of FIG. 2C.

Referring to FIG. 2C, the width of each of the plurality of depressions 141a, 141b, 142a, and 142b may increase inwardly of each of the plurality of depressions 1411a, 141b, 142a, and 142b from the first outer surface of one of the plurality of cover layers 112 and 113 in the first direction (e.g., the T direction). For example, when the shrinkage rate of the plurality of cover layers 112 and 113 is relatively low, the shape of the plurality of depressions 141a, 141b, 142a, and 142b before firing (heat treatment) may be close to the shape of the plurality of depressions 141a, 141b, 142a, and 142b of FIG. 2B.

Referring to FIG. 2D, the width of each of the plurality of depressions 141a, 141b, 142a, and 142b may decrease inwardly of each of the plurality of depressions 141a, 141b, 142a, and 142b from the first outer surface of one of the plurality of cover layers 141a, 141b, 142a, and 142b in the first direction (e.g., the T direction). For example, when the shrinkage rate of the plurality of cover layers 112 and 113 is relatively high, the shape of the plurality of depressions 141a, 141b, 142a, and 142b before firing (heat treatment) may be close to the shape of the plurality of depressions 141a, 141b, 142a, and 142b of FIG. 2B.

Meanwhile, L1, L2, L3, L4, T1, T2, and T3 in the present specification may be measured as an average value of portions corresponding to L1, L2, L3, L4, T1, T2, and T3 in an L-T cross-section of the multilayer ceramic capacitor (including the center of the multilayer ceramic capacitor) formed by polishing the multilayer ceramic capacitor in the W direction. For example, the L-T section may be applied to analysis using at least one of transmission electron microscopy (TEM), atomic force microscope (AFM), scanning electron microscope (SEM), an optical microscope, and a surface profiler, and L1, L2, L3, L4, T1, T2, and T3 may be measured by visual confirmation or image processing of an image obtained according to the above analysis (e.g., identifying pixels based on color or brightness of the pixels, filtering pixel values for pixel identification efficiency, integration of distances between identified pixels, etc.).

The multilayer ceramic capacitor according to an exemplary embodiment in the present disclosure may have a structure that reduces a possibility of the occurrence of defects (e.g., cracks, delamination) and may be stably manufactured.

Alternatively, the multilayer ceramic capacitor may have a structure that may be stably manufactured even in a state in which it is difficult to accurately know internal shrinkage characteristics and provide a higher degree of freedom in design.

Alternatively, the multilayer ceramic capacitor may have improved reliability by stably blocking penetration of external moisture or foreign matter.

Alternatively, the multilayer ceramic capacitor may have a stable structure by absorbing an internal step difference.

While example exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a body including a capacitance region in which a first internal electrode and a second internal electrode are alternately stacked in a first direction with a dielectric layer interposed therebetween; and
   first and second external electrodes spaced apart from each other with the capacitance region interposed therebetween in a second direction, different from the first direction, disposed on the body, and connected to the first and second internal electrodes, respectively,
   wherein the body further includes a plurality of cover layers disposed to sandwich the capacitance region therebetween in the first direction,
   one of the plurality of cover layers has a plurality of depressions each disposed in a first outer surface thereof in the first direction,
   the plurality of depressions are respectively spaced apart from outer surfaces of the one of the plurality of cover layers in the second direction,
   a bending length of each of the first and second external electrodes in the second direction is greater than a longest distance from each of the outer surfaces of the one of the plurality of cover layers in the second direction to a closer one of the plurality of depressions, and
   a width of at least one of the plurality of depressions increases inwardly from the first outer surface of the one of the plurality of cover layers in the first direction.

2. The multilayer ceramic capacitor of claim 1, wherein a portion of the first external electrode is disposed inside of one of the plurality of depressions, and a portion of the second external electrode is disposed inside of another one of the plurality of depressions.

3. The multilayer ceramic capacitor of claim 1, wherein each of the plurality of cover layers has the plurality of depressions.

4. The multilayer ceramic capacitor of claim 1, wherein each of the plurality of depressions extends in a third direction, different from the first and second directions.

5. The multilayer ceramic capacitor of claim 4, wherein the body further includes a plurality of margin regions disposed to sandwich the capacitance region therebetween in the third direction, and the plurality of depressions do not extend to be disposed in outer surfaces of the plurality of margin regions in the third direction.

6. The multilayer ceramic capacitor of claim 1, wherein a depth of each of the plurality of depressions is greater than a thickness of the dielectric layer and smaller than a thickness of the one of the plurality of cover layers.

7. The multilayer ceramic capacitor of claim 1, wherein the dielectric layer includes a ferroelectric material, and each of the plurality of cover layers includes a ferroelectric material.

8. The multilayer ceramic capacitor of claim 1, wherein each of the plurality of depressions overlaps the first internal electrode and the second internal electrode in the first direction.

9. A multilayer ceramic capacitor comprising:

a body including a capacitance region in which a first internal electrode and a second internal electrode are alternately stacked in a first direction with a dielectric layer interposed therebetween; and first and second external electrodes spaced apart from each other with the capacitance region interposed therebetween in a second direction, different from the first direction, disposed on the body, and connected to the first and second internal electrodes, respectively, wherein the body further includes a plurality of cover layers disposed to sandwich the capacitance region therebetween in the first direction, one of the plurality of cover layers has a plurality of depressions each disposed in a first outer surface thereof in the first direction, the plurality of depressions are respectively spaced apart from outer surfaces of the one of the plurality of cover layers in the second direction, each of the plurality of depressions overlaps the first internal electrode and the second internal electrode in the first direction such that all depressions disposed in the first outer surface of the one of the plurality of cover layers overlaps the first internal electrode and the second internal electrode in the first direction, and a width of at least one of the plurality of depressions increases inwardly from the first outer surface of the one of the plurality of cover layers in the first direction.

10. The multilayer ceramic capacitor of claim 9, wherein a portion of the first external electrode is disposed inside of one of the plurality of depressions, and a portion of the second external electrode is disposed inside of another one of the plurality of depressions.

11. The multilayer ceramic capacitor of claim 9, wherein each of the plurality of cover layers has the plurality of depressions.

12. The multilayer ceramic capacitor of claim 9, wherein each of the plurality of depressions extends in a third direction, different from the first and second directions.

13. The multilayer ceramic capacitor of claim 12, wherein the body further includes a plurality of margin regions disposed to sandwich the capacitance region therebetween in the third direction, and the plurality of depressions do not extend to be disposed in outer surfaces of the plurality of margin regions in the third direction.

14. The multilayer ceramic capacitor of claim 9, wherein a depth of each of the plurality of depressions is greater than a thickness of the dielectric layer and smaller than a thickness of the one of the plurality of cover layers.

15. The multilayer ceramic capacitor of claim 9, wherein the dielectric layer includes a ferroelectric material, and each of the plurality of cover layers includes a ferroelectric material.

16. A multilayer ceramic capacitor comprising:

a body including a capacitance region in which a first internal electrode and a second internal electrode are alternately stacked in a first direction with a dielectric layer interposed therebetween; and first and second external electrodes disposed on outer end surfaces of the body and spaced apart from each other in a second direction, different from the first direction, and connected to the first and second internal electrodes, respectively, wherein the body further includes a plurality of depressions each disposed on at least one outer surface thereof in the first direction, extending in a third direction, different from the first and second directions, and having two wall surfaces facing each other in the second direction, each of the first and second external electrodes extends onto the at least one outer surface of the body and covers at least a portion of a closer one of the plurality of depressions, and a width of at least one of the plurality of depressions increases inwardly from the at least one outer surface of the body in the first direction.

17. The multilayer ceramic capacitor of claim 16, wherein L2<L1<L4<L3, where a length measured from one of the outer end surfaces of the body to an end of the first or second internal electrode spaced therefrom in the second direction is defined as 'L2', a length measured from one of the outer end surfaces of the body to one of the two wall surfaces of the depression is defined as 'L1', a length measured from one of the outer end surfaces of the body to the other one of the two wall surfaces of the depression is defined as 'L4', and a bending length of each of the first and second external electrodes in the second direction is defined as 'L3'.

18. The multilayer ceramic capacitor of claim 16, wherein the body further includes a plurality of cover layers disposed to sandwich the capacitance region therebetween in the first direction, and a depth of each of the plurality of depressions is greater than a thickness of the dielectric layer and smaller than a thickness of one of the plurality of cover layers.

19. The multilayer ceramic capacitor of claim 16, wherein the plurality of depressions do not extend to be disposed in outer surfaces of the body in the third direction.

20. The multilayer ceramic capacitor of claim 16, wherein each of the first and second external electrodes comprises:

a base electrode layer disposed on one of the outer end surfaces of the body to be connected to the first or second internal electrode and having a band portion extending to cover one of the depressions;

a conductive resin layer disposed to cover the base electrode layer and having a conductivity smaller than that of the base electrode layer; and a plating layer disposed to cover the conductive resin layer, wherein a portion of the base electrode layer is disposed inside of the one of the depressions.

21. The multilayer ceramic capacitor of claim 16, wherein the at least one outer surface of the body includes upper and lower surfaces opposing in the first direction, the plurality of depressions include two upper depressions spaced apart from each other and disposed in the upper surface of the body, and two lower depressions spaced apart from each other and disposed in the lower surface of the body, and the first external electrode covers one of the two upper depressions and one of the two lower depressions, and the second external electrode covers the other one of the two upper depressions and the other one of the two lower depressions.

22. The multilayer ceramic capacitor of claim 16, further comprising a coating layer contacting the upper and lower surfaces of the body and further extending onto portions of the first and second external electrodes disposed on the upper and lower surfaces of the body.

\* \* \* \* \*